Patented Apr. 12, 1927.

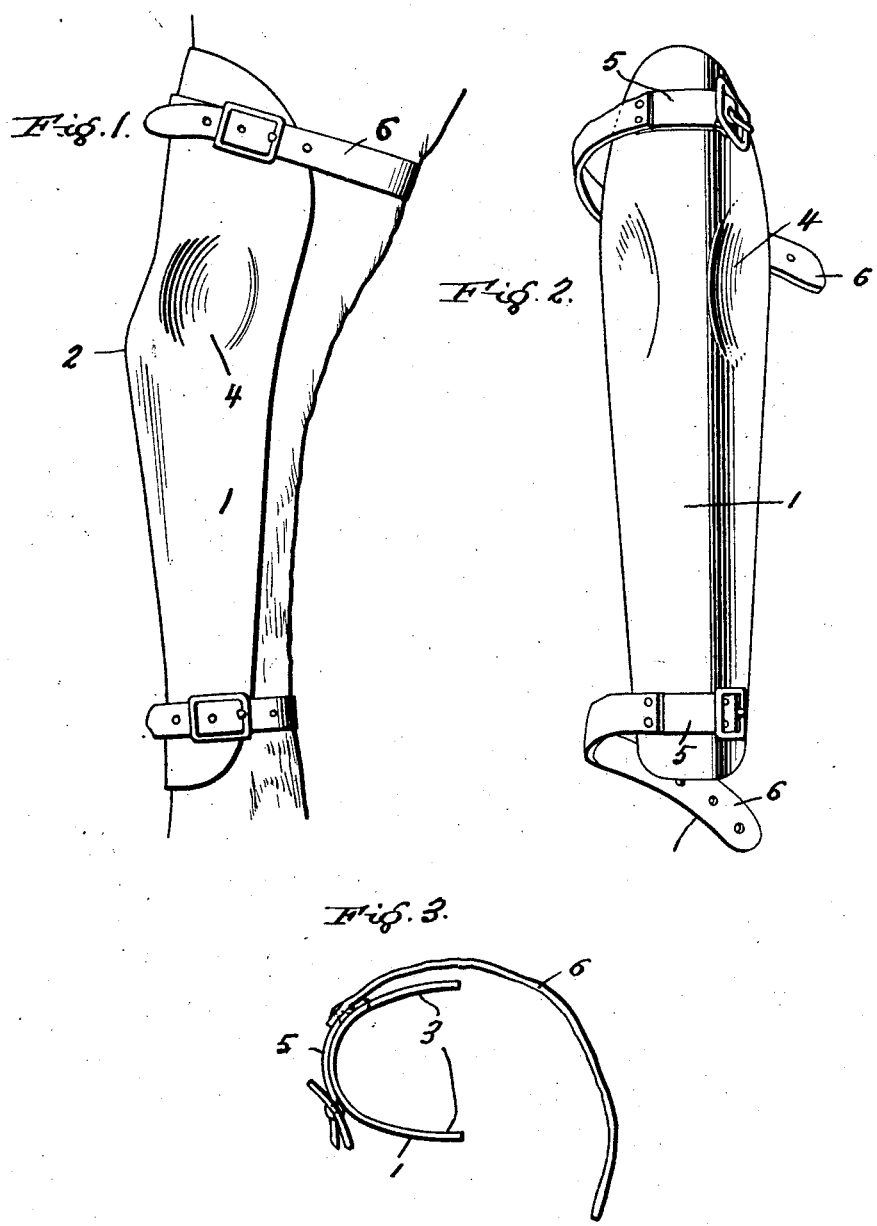

1,624,861

UNITED STATES PATENT OFFICE.

JOHN DEWEY, OF PERRY, NEW YORK.

ANTIKICKING DEVICE.

Application filed June 8, 1925, Serial No. 35,753. Renewed March 4, 1927.

An object of the invention is the provision of a simple means for preventing unruly milch cows and fractious horses from kicking when the cow is being milked and when the horse is being shod.

A further object is the provision of a boot for this purpose constructed of comparatively hard material adapted to be arranged over the rear of the animal's leg to embrace the sides of the leg and to enclose the gambrel joint and having its sides provided with inwardly swelled portions forming protrusions that are received in the concavities in the animal's leg above the point of the hock, so that the boot will be prevented from slipping on the animal's leg after the same is strapped.

The drawings which accompany and which form part of this application illustrate a satisfactory embodiment of the improvement, and wherein:

Figure 1 is an elevation illustrating the application of my invention.

Figure 2 is a rear elevation of the improvement.

Figure 3 is a top plan view of the improvement.

As disclosed in Figure 1 of the drawings, my improved boot is comparatively long, and as disclosed in Figure 3 of the drawings the boot comprises a member which is substantially U-shaped in plan. The boot 1 may be constructed of any desired tough material and has its central portion rounded, as at 2, to engage the point of the hock of the animal. From the rounded portion 2 the boot is inclined in opposite directions. The boot from its said rounded portion inclines in opposite directions to conform to the upper and to the shank portion of the animal's leg. The sides 3 are comparatively wide, so that the major portion of the animal's leg is received in the boot. Above the hock or gambrel joint the leg of both cows and horses is concaved inwardly, and the sides 3 of the boot 1, which is arranged opposite these depressions, are swelled inwardly to provide rounded protrusions 4. By this arrangement the boot can be readily positioned upon the animal's leg without liability of injury by the kicking of the animal and will be effectively held from slipping when so arranged.

The boot 1 adjacent to its ends has secured on its outer face buckle carrying straps or plates 5, and to the ends of these straps or plates there are secured other straps 6 designed to be engaged by the buckles.

The improvement will cause no discomfort to the animal, and may be quickly applied or removed, and as the same prevents the lifting of the animal's leg danger of the animal kicking is entirely obviated.

Having thus described the invention, what is claimed as new, is:—

An anti-kicking boot comprising a member of tough but pliable material which is substantially U-shaped in cross section, and shaped to be arranged around and to conform to the shape of the rear portion of an animal's rear leg from points to the opposite sides of the point of the hock of the animal's leg, said boot having its sides inwardly swelled to provide protrusions designed to be received in the depressions in the animal's leg above the hock whereby, such depressions in connection with the shape of the boot will permit of the said boot being clasped and temporarily sustained on the leg of the animal, and means comprising straps for fastening the boot on the leg of the animal.

In testimony whereof I affix my signature.

JOHN DEWEY.